(12) United States Patent
Chen

(10) Patent No.: US 11,068,416 B2
(45) Date of Patent: Jul. 20, 2021

(54) PROCESSING DEVICE AND METHOD FOR CHANGING FUNCTION OF PINS

(71) Applicant: Nuvoton Technology Corporation, Hsinchu (TW)

(72) Inventor: Yi-An Chen, Hsinchu (TW)

(73) Assignee: NUVOTON TECHNOLOGY CORPORATION, Hsinchu Science Park (TW)

(*) Notice: Subject to any disclaimer, the term of this patent is extended or adjusted under 35 U.S.C. 154(b) by 112 days.

(21) Appl. No.: 16/700,019

(22) Filed: Dec. 2, 2019

(65) Prior Publication Data

US 2020/0183860 A1 Jun. 11, 2020

(30) Foreign Application Priority Data

Dec. 5, 2018 (TW) .................. 107143542

(51) Int. Cl.
  *G06F 12/12* (2016.01)
  *G06F 12/126* (2016.01)
  *G06F 12/0891* (2016.01)

(52) U.S. Cl.
  CPC ........ *G06F 12/126* (2013.01); *G06F 12/0891* (2013.01)

(58) Field of Classification Search
  CPC . G06F 12/0891; G06F 12/126; G06F 15/7867
  See application file for complete search history.

(56) References Cited

U.S. PATENT DOCUMENTS 9,478,295 B2 * 10/2016 Choi ................. G11C 16/3459
10,191,533 B2 * 1/2019 Chu ..................... G06F 1/3268

OTHER PUBLICATIONS

H. Yang, S. Kuo, T. Huang, C. Chen, C. Lin and M. C. -. Chao, "Random pattern generation for post-silicon validation of DDR3 SDRAM," 2015 IEEE 33rd VLSI Test Symposium (VTS), 2015, pp. 1-6.*
C. Melear, "Emulation techniques for microcontrollers," WESCON/97 Conference Proceedings, 1997, pp. 532-541.*
Mubing Li, Min Xie, Guoman Liu and Xiaochao Liu, "A SPI FLASH-based FPGA dynamic reconfiguration method," 2013 IEEE International Conference on Microwave Technology & Computational Electromagnetics, 2013, pp. 379-382.*
"Method for generating soft bits in flash memories", The IP.com Prior Art Database, https://ip.com/IPCOM/000147011, Mar. 2007.*

* cited by examiner

*Primary Examiner* — Pierre Miche Bataille

(74) *Attorney, Agent, or Firm* — Muncy, Geissler, Olds & Lowe, P.C.

(57) ABSTRACT

A processing device is provided. The processor of the processing device executes a first command to generate first setting values used to set the functions of the pins and writes the initial setting values into the register. When the initial setting values need to be changed to change the function of one or more pins, the processor executes a second command to generate second setting values used to set the functions of the pins and writes the second setting values into the register to replace the initial setting values. When the second setting values are written into the register, the register determines whether to replace the initial setting values with the second setting values according to the second setting values. When the register determines whether to replace the initial setting values with the second setting values, the register ignores the value 0 in the second setting values.

8 Claims, 2 Drawing Sheets

PROCESSING DEVICE AND METHOD FOR CHANGING FUNCTION OF PINS

CROSS REFERENCE TO RELATED APPLICATIONS

This Application claims priority of TW Patent Application No. 107143542 filed on Dec. 5, 2018, the entirety of which is incorporated by reference herein.

BACKGROUND OF THE INVENTION

Field of the Invention

The invention generally relates to a technology for changing the functions of pins, and more particularly, to a technology in which, when the set values of the functions of the pins of a processing device need to be changed, the set value 0 will be ignored.

Description of the Related Art

Traditionally, when a user wants to change the functions of the pins of a processing device (e.g. a microcontroller (MCU)), the setting values corresponding to the functions of the pins will be changed (i.e. the new setting values will replace the original setting values), wherein the setting values may be stored in a register of the processing device.

However, when the function of a pin does not need to be changed, in the new setting values, the setting value corresponding to the pin whose function does not need to be changed is set to 0. Therefore, the register may misrecognize that the function of the pin whose function does not need to be changed needs to be changed to function 0 (i.e. the register may regard 0 in the new setting values as function 0). For example, if the initial setting values of pins of the processing device is 000000AB, when the user wants to change the functions of the third pin and the fourth pin to function A, the new setting values received by the register will be 00AA0000. Therefore, the register may misrecognize that the functions of the first pin and the second pin need to be changed to function 0.

Traditionally, in order to avoid the aforementioned problem, the processing device may store the setting values which do not need to be changed in another register in advance. Therefore, the computational capacity of the processing device will be increased.

BRIEF SUMMARY OF THE INVENTION

The invention provides processing devices and methods for changing the functions of pins to overcome the problems described above.

An embodiment of the invention provides a processing device. The processing device includes a plurality of pins, a memory device, a register and a processor. The memory device stores a plurality of commands. The processor is coupled to the memory device and the register. The processor executes a first command stored in the memory device to generate first setting values which are used to set the functions of the pins and writes the initial setting values into the register. When the initial setting values need to be changed to change the function of one or more pins, the processor executes a second command to generate second setting values which are used to set the functions of the pins and writes the second setting values into the register to replace the initial setting values. When the second setting values are written into the register, the register determines whether to replace the initial setting values with the second setting values according to the second setting values. When the register determines whether to replace the initial setting values with the second setting values, the register ignores the value 0 in the second setting values.

An embodiment of the invention provides a method for changing the functions of pins. The method for changing the functions of pins is applied to a processing device. The method for changing the functions of pins includes the steps of using a processor of the processing device to execute a first command stored in a memory device of the processing device to generate first setting values which are used to set functions of a plurality of pins of the processing device; writing the initial setting values into a register of the processing device; when the initial setting values need to be changed to change the function of one or more pins, using the processor to execute a second command to generate second setting values which are used to set the functions of the pins; and when the second setting values need to be written into the register, using the register to determine whether to replace the initial setting values with the second setting values according to the second setting values. When the register determines whether to replace the initial setting values with the second setting values, the register ignores the value 0 in the second setting values.

Other aspects and features of the invention will become apparent to those with ordinary skill in the art upon review of the following descriptions of specific embodiments of the processing devices and methods for changing the functions of pins.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
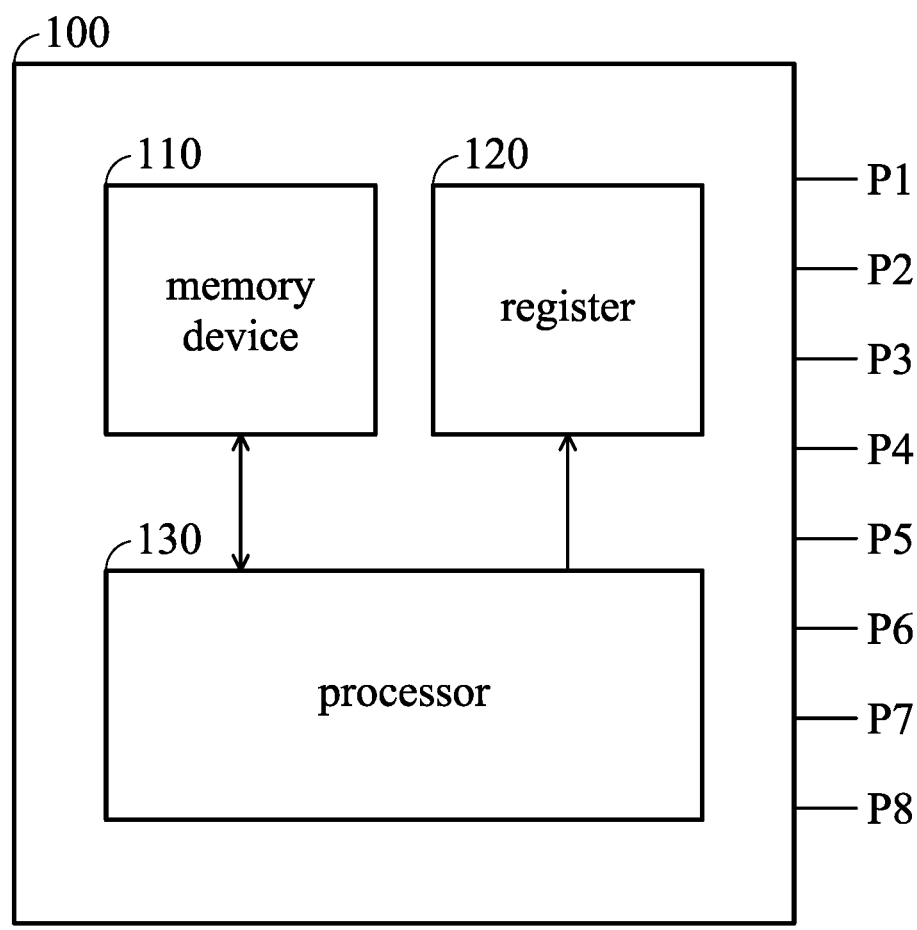
FIG. 1 is a block diagram of a microcontroller (MCU) 100 according to an embodiment of the invention.

FIG. 1 is a block diagram of a processing device 100 according to an embodiment of the invention. According to an embodiment of the invention, the processing device 100 may be a microcontroller (MCU) or a microprocessor (MPU). As shown in FIG. 1, the processing device 100 may comprise a memory device 110, a register 120, a processor 130 and pins P1~P8. It should be noted that in order to clarify the concept of the invention, FIG. 1 presents a simplified block diagram in which only the elements relevant to the invention are shown. However, the invention should not be limited to what is shown in FIG. 1. The processing device 100 may comprise other elements. In addition, in other embodiments, the processing device 100 may comprise different number of pins. According to an embodiment of the invention, the processing device 100 may comprise a plurality of registers. In addition, according to an embodiment of the invention, the processing device 100 may be a multi-cores processor.

According to an embodiment of the invention, the memory device 110 may be a volatile memory (e.g. random access memory (RAM)), a non-volatile memory (e.g. flash memory, read only memory (ROM)), or any combination thereof. In an embodiment of the invention, the memory device 110 may store a plurality of command which are used to set the functions of pins P1~P8 of the processing device 100. According to an embodiment of the invention, memory device 110 may comprise a plurality of banks.

According to an embodiment of the invention, the register 120 may store the setting values corresponding to the pins P1~P8 of the processing device 100 to set the functions of pins P1~P8. In the embodiments of the invention, each of the pins P1~P8 may be set to different functions. For example, if the setting value is 32 bits (the invention should not be limited thereto), each of the pins P1~P8 may be configured 4 bits to set its function. That is to say, there are 16 functions can be used to set the function of each of the pins P1~P8, and the 16 functions may be present by 0~F (i.e. 0~9 and A~F). It should be noted that in the embodiments of the invention, when the function of a pin is set to function 0, the setting value will be ignored (i.e. the pin may maintain original setting value). Details are illustrated below.

According to an embodiment of the invention, when the user needs to change or modify the functions of pins P1~P8 of the processing device 100, the processor 130 may read the command which is used to change or modify the functions of pins P1~P8 from the memory device 110 and execute the command to generate the setting values for changing or modifying the functions of pins P1~P8. Then, the processor 130 may write the setting values for changing the functions of pins P1~P8 into the register 120.

According to an embodiment of the invention, the register 120 may determine whether change the original setting values (i.e. initial setting values) of pins P1~P8 according to the new setting values (i.e. second setting values) which need to be write into the pins.

According to an embodiment of the invention, when the new setting value which needs to be written into a pin is 0, the register 120 may ignore the new setting value. That is to say, when the register 120 determines whether change the original setting value of this pin, the register 120 may maintain the original setting value of the pin rather than changing the setting value of the pin to the new setting value. For example, if the new setting value which needs to be written into the pin P1 is 0, the register 120 may maintain the original setting value (e.g. one of 0~F) of the pin P1 rather tan changing the setting value of the pin P1 to 0.

According to an embodiment of the invention, when the new setting value which needs to be written into a pin is not 0 (e.g. one of 1~F), when the register 120 determines whether change the original setting value of the pin, the register 120 may replace the original setting value of the pin with the new setting value. For example, if the new setting value which needs to be written into the pin P1 is A, the register 120 may change the setting value of the pin P1 to A.

Therefore, according to the embodiments of the invention, when the register 120 updates the setting value of the pins P1~P8, the register 120 can avoid changing the setting values of the pins whose function do not need to be changed. For example, if the initial setting values of pins P1~P8 is 000000AB (i.e. the initial setting value of the function of pin P1 is function B, the initial setting value of the function of pin P2 is function A, and the initial setting values of the functions of other pins are function 0 (i.e. no function)), when the user determines to change the initial setting values of pins P1~P8 according to the second setting values 0000CD00 (i.e. the user only wants to change the setting value of the function of pin P3 to function D, and change the setting value of the function of pin P4 to function C), the register 120 may use the non-zero setting values of the second setting values to replace the initial setting values. Therefore, when the register 120 changes the initial setting values according to the second setting values, the setting values of the pins P1~P8 may be changed to 0000CDAB. Accordingly, it can be avoid that the setting values of the functions of pin P1 and pin P2 are changed to function 0. For another example, when the user determines to change the initial setting values of pins P1~P8 according to the third setting values 0000CDEF, the register 120 may change the initial setting values of pins P1~P8 from 000000AB to 0000CDEF. Accordingly, when the setting values of pins P1~P8 need to be changed again, the register 120 may change or modify the setting values of pins P1~P8 according to the above changing mechanism.

In addition, according to the embodiments of the invention, during changing the setting values of pins P1~P8, the processing device 100 does not need to store the setting value of the pins whose functions do not need to be changed in another register in advance. Therefore, the computation of the processor 130 of the processing device 100 will be reduced.

According to an embodiment of the invention, the processing device 100 may further comprise a multiplexer (MUX) circuit (not shown in figure). The MUX circuit may be coupled to the pins P1~P8 and register 120. After the register 120 updates the setting value of the pins P1~P8, the MUX circuit may provide the data to the pins P1~P8 according to the updated setting values of pins P1~P8.

Figure 2:
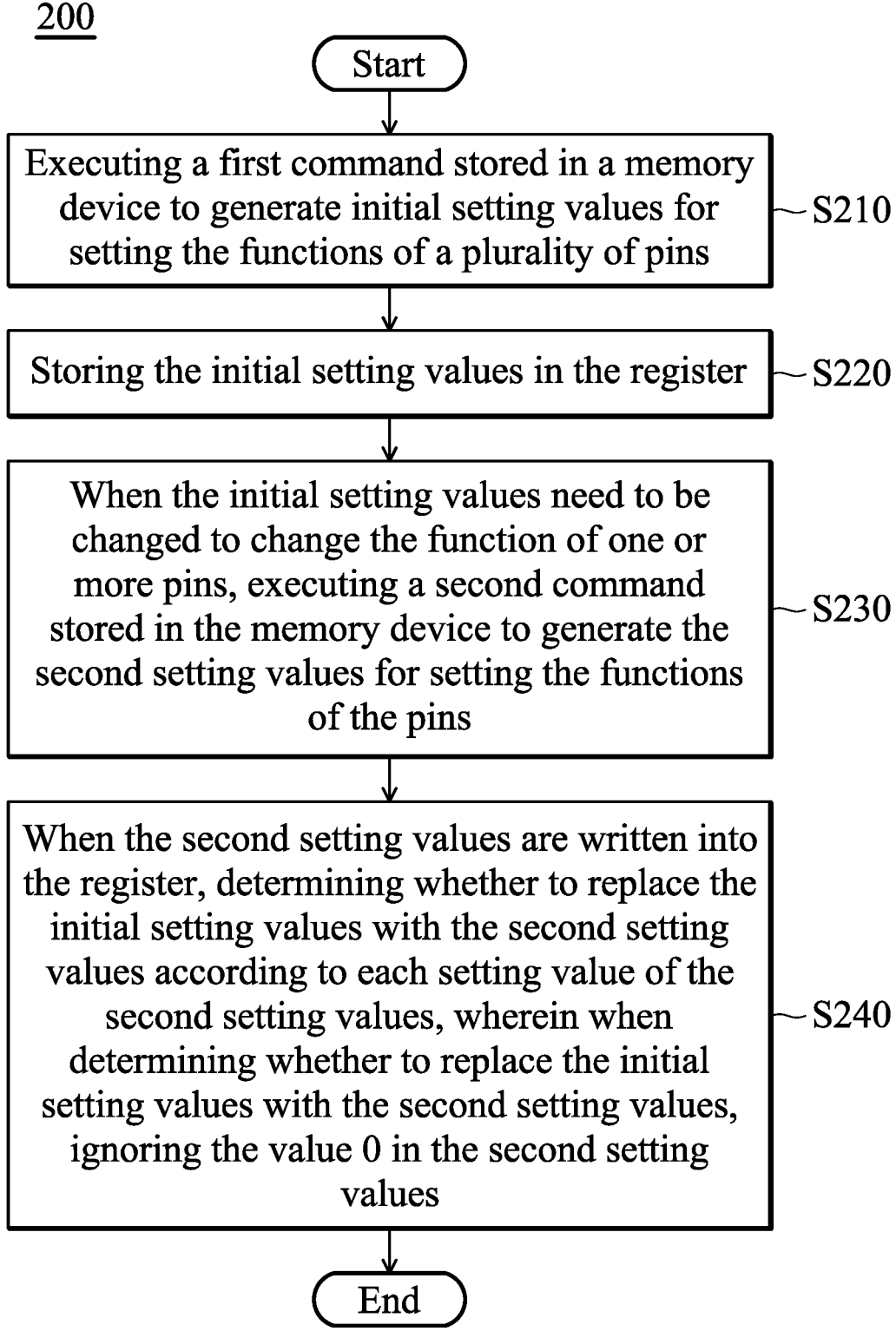
FIG. 2 is a flow chart 200 illustrating a method for changing the functions of pins according to an embodiment of the invention.

FIG. 2 is a flow chart 200 illustrating a method for changing the functions of pins according to an embodiment of the invention. The method for changing the functions of pins can be applied to the processing device 100 of the invention. In step S210, a processor of the processing device 100 executes a first command stored in a memory device of the processing device 100 to generate initial setting values for setting the functions of a plurality of pins of the processing device 100. In step S220, the processor of the processing device 100 stores the initial setting values in the register of the processing device 100. In step S230, when the initial setting values need to be changed to change the function of one or more pins, the processor of the processing device 100 may executes a second command stored in a memory device of the processing device 100 to generate the second setting values for setting the functions of a plurality of pins of the processing device 100. In step S240, when the second setting values are written into the register of the processing device 100, the register of the processing device 100 may determine whether to replace the initial setting values with the second setting values according to each setting value of the second setting values, wherein when the register of processing device 100 determines whether to replace the initial setting values with the second setting values, the register of the processing device 100 may ignore the value 0 in the second setting values.

According to an embodiment of the invention, the method for changing the functions of pins further comprise that if in the initial setting values, the setting value corresponding to a first pin of the pins is a first value and in the second setting values, the setting value corresponding to the first pin is 0, when the register of the processing device 100 determines whether to replace the initial setting values with the second setting values, the register of the processing device 100 may maintain the setting value of the first pin at the first value (i.e. maintain the original function of the first pin), wherein the first value may be 0 or a non-zero value.

According to an embodiment of the invention, the method for changing the functions of pins further comprise that if in the initial setting values, the setting value corresponding to a first pin of the pins is a first value and in the second setting values, the setting value corresponding to the first pin is a non-zero value (e.g. a second value), when the register of the processing device 100 determines whether to replace the initial setting values with the second setting values, the register of the processing device 100 may replace the first value with the second value (i.e. change the setting value of the first pin from the first value to the second value), wherein the first value may be 0 or a non-zero value.

According to an embodiment of the invention, the method for changing the functions of pins further comprise that after the setting values of the pins are changed, a multiplexer (MUX) circuit of the processing device 100 provides the data to the pins according to the updated setting values of pins.

According to the method for changing the functions of pins, when the user changes the functions corresponding to the pins of the processing device, it can be avoid that the setting values of the pins whose function does not need to be changed are changed or modified.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for changing the functions of pins, applied to a processing device, and comprising:
   executing, by a processor of the processing device, a first command stored in a memory device of the processing device to generate first setting values which are used to set functions of a plurality of pins of the processing device;
   writing the initial setting values into a register of the processing device;
   when the initial setting values need to be changed to change the function of one or more pins of the plurality of pins, executing, by the processor, a second command to generate second setting values which are used to set the functions of the plurality of pins; and
   when the second setting values need to be written into the register, determining, by the register, whether to replace the initial setting values with the second setting values according to the second setting values;
   wherein when the register determines whether to replace the initial setting values with the second setting values, the register ignores the value 0 in the second setting values.

2. The method for changing the functions of pins of claim 1, further comprising:
   if in the initial setting values, the setting value corresponding to a first pin of the plurality of pins is a first value and in the second setting values, the setting value corresponding to the first pin is 0, when the register determines whether to replace the initial setting values with the second setting values, maintaining, by the register, the setting value of the first pin at the first value, wherein the first value is 0 or a non-zero value.

3. The method for changing the functions of pins of claim 1, further comprising:
   if in the initial setting values, the setting value corresponding to a first pin of the plurality of pins is a first value and in the second setting values, the setting value corresponding to the first pin is a non-zero value, when the register determines whether to replace the initial setting values with the second setting values, replacing, by the register, the first value with the second value, wherein the first value is 0 or a non-zero value.

4. The method for changing the functions of claim 1, further comprising:
   after the setting values of the plurality of pins are changed, providing, by a multiplexer (MUX) circuit, data to the plurality of pins according to the updated setting values of the plurality of pins.

5. A processing device, comprising:
   a plurality of pins;
   a memory device, storing a plurality of commands;
   a register; and
   a processor, coupled to the memory device and the register;
   wherein the processor executes a first command stored in the memory device to generate first setting values which are used to set functions of the plurality of pins and writes the initial setting values into the register;
   wherein when the initial setting values need to be changed to change the function of one or more pins of the plurality of pins, the processor executes a second command to generate second setting values which are used to set the functions of the plurality of pins and writes the second setting values into the register to replace the initial setting values;

wherein when the second setting values are written into the register, the register determines whether to replace the initial setting values with the second setting values according to the second setting values; and wherein when the register determines whether to replace the initial setting values with the second setting values, the register ignores the value 0 in the second setting values.

6. The processing device of claim 5, wherein if in the initial setting values, the setting value corresponding to a first pin of the plurality of pins is a first value and in the second setting values, the setting value corresponding to the first pin is 0, when the register determines whether to replace the initial setting values with the second setting values, the register maintains the setting value of the first pin at the first value, wherein the first value is 0 or a non-zero value.

7. The processing device of claim 5, wherein if in the initial setting values, the setting value corresponding to a first pin of the plurality of pins is a first value and in the second setting values, the setting value corresponding to the first pin is a non-zero value, and when the register determines whether to replace the initial setting values with the second setting values, the register replaces the first value with the second value, wherein the first value is 0 or a non-zero value.

8. The processing device of claim 5, further comprising:

a multiplexer (MUX), wherein after the setting values of the plurality of pins are changed, the MUX circuit provides data to the plurality of pins according to the updated setting values of the plurality of pins.

* * * * *